United States Patent [19]

Sibeud

[11] 3,943,792
[45] Mar. 16, 1976

[54] METHOD AND DEVICE FOR ASCERTAINING THE STATE OF A GEAR BOX, IN PARTICULAR IN A MOTOR VEHICLE

[76] Inventor: Jean-Paul Sibeud, Chaponnay (Rhône), France

[22] Filed: Aug. 5, 1974

[21] Appl. No.: 495,061

[30] Foreign Application Priority Data
Aug. 6, 1973 France .............................. 73.29271

[52] U.S. Cl. ...... 74/473 R; 74/DIG. 7; 116/DIG. 20; 200/61.91
[51] Int. Cl.² ....................... H01H 3/16; G05G 9/12
[58] Field of Search ..................... 74/473 R, DIG. 7; 116/DIG. 20; 200/61.91

[56] References Cited
UNITED STATES PATENTS
1,921,273   8/1933   Wald ............................ 200/61.91
3,665,775   5/1972   Freeman ......................... 74/473 R
3,748,417   7/1973   Morino et al. .................... 200/61.91

*Primary Examiner*—Allan D. Herrmann
*Attorney, Agent, or Firm*—Irving M. Weiner; Pamela S. Burt

[57] ABSTRACT

A system for detecting the state of a gear box. Sliding gear selector rods control gear shift forks, and carry notches into which bars may fall. Each of such bars actuates an electrical device for emitting a binary bit. All of the binary bits together form a coded element the reading of which is made with reference to a binary standard to determine the position of the selector rods, which in turn determines the gear ratio or state of the gear box.

10 Claims, 4 Drawing Figures

METHOD AND DEVICE FOR ASCERTAINING THE STATE OF A GEAR BOX, IN PARTICULAR IN A MOTOR VEHICLE

The present invention relates to a new method and a new device intended to detect the state of a gear box at any given time, that is, to detect whether the gear box is in neutral, or else which gear is engaged.

BACKGROUND OF THE INVENTION

Systems are known which are used to detect the state or instantaneous position of a gear box. Such known systems use electrical limit contactors which are intended to detect the position of each of the sliding rods which carry the gear control forks.

These known systems have various drawbacks, in particular:

a. Since each sliding rod is likely to have three positions, to wit, two end positions of engaged gear and one central position of neutral gear, it is necessary to provide at least three electric contactors on each rod. This leads to provide, for instance, fourteen contactors on an eight-speed gear box, or twenty-one contactors on a fourteen-speed gear box. It will be readily understood that such a great number of contactors makes the gear box expensive, fragile, difficult to keep in good order, and exposed or subject to frequent failures.

b. Since each contactor must be set by the corresponding rod, the workshop manufacturing the gear boxes is led to deal both with mechanical parts and electric micro-switches; since these two operations require normally quite differently qualified workers, it is not very convenient to group them in the same shop.

c. The gear box must have been wholly designed in a special way, so that it is not possible to equip existing boxes.

The object of the present invention is to obviate such drawbacks by providing a simple and inexpensive device which is readily added to gear boxes of a standard type in an independent shop.

SUMMARY OF THE INVENTION

The present invention provides a method for detecting the state of a gear box, comprising the steps of controlling the various gear ratios of the gear box by means of movable members, and generating binary bits in response to the relative positions of the movable members, all of such binary bits together constituting a coded element. The method also includes the step of detecting the coded element with reference to a binary standard, and detecting the state of the gear box by determining the instantaneous position of the movable members by such detection of the coded element with reference to the binary standard.

The present invention also provides a system for detecting the state of a gear box, comprising, in combination, first means for controlling the various gear ratios of the gear box, and second means for generating binary bits in response to the relative positions of said first means, all of said binary bits together constituting a coded element. There is also provided third means for detecting the coded element with reference to a binary standard. There is also provided fourth means for detecting the state of the gear box by determining the instantaneous position of said first means by such detection of the coded element with reference to the binary standard.

The method according to the invention for detecting the state of a gear box, the various forward, reverse and neutral gear ratios of which are controlled by movable members such as sliding gear selector rods, is characterized in that a binary logical count code is used for detecting at every moment the position of the whole of said movable members, so that each of the possible states of the gear box is characterized by one element of a binary coding standard, all the elements of which have a same number of bits.

Pick-up means are provided to define each bit. Of course, said means may be of any known type, such as mechanical, electrical (micro-switches), pneumatic (pneumatic elements of binary logic), optical, hydraulic, or electronic.

According to a first feasible embodiment, electric limit micro-switches are used, each of which is capable of taking up either an open position or a closed position. Thus, with only five micro-switches, a 5 bit coding standard is available, that is, a standard capable of detecting $2^5 = 32$ states of the gear box at a maximum.

It will be seen that such an arrangement would be suitable for detecting all the possible states of a thirty speed gear box, which is widely exceeding the practical cases encountered. (Note: the number of possible states of a gear box is generally equal to that of the gears plus two, to wit, number of gears + general neutral position + reverse gear).

A detecting device according to the invention for carrying the above method into practice is characterized in that it includes pick-up means mounted on the casing of the gear box, the number of said means being equal to that of the movable members such as sliding gear selector rods, each of said pick-up means supplying a "0" bit or a "1" bit at every moment, while all said bits together constitute a coded element, the reading of which is then made by known means, with reference to a binary standard.

According to another feature of the invention, the coding standard is constituted by:

notches cut out at calculated and/or predetermined locations on the backs of the movable members controlling the gear box (for instance, on the backs of the gear selector rods which slide side by side, in parallel relationship to each other);

movable transverse bars, each of which bears elastically on the backs of all the selector rods to which they are perpendicularly oriented, in a manner such that a bar falls when each rod presents a notch opposite said bar;

binary micro-switches, each of which is fitted to a transverse bar and emits, for instance, a "0" bit if the bar has fallen into the aligned notches, and a "1" bit if at least one selector rod has prevented said bar from falling down.

It will be seen that such an arrangement offers many advantages, as regards, in particular, 1. Reliability — Since the number of wires, tubes, or microswitches is substantially reduced, the maker is able to use apparatus of a better quality without increasing the overall cost of the device.

2. Manufacture — The manufacture is simplified as regards both the wiring and the mechanical assembling.

3. Accommodation — All the pick-up means are fitted to the removable casing of the gear box, which allows manufacturing and equipping said casing in a workshop separate from that where the gear boxes are manufactured. It is thus possible to use qualified and specialized workers for each operation. Moreover, it is possible to fit the cover or casing thus obtained to existing gear boxes.

4. Repairing — Repairs are simplified, in particular by a reduction in the number of possible errors in the electric wirings. Moreover, the fact that the device is simple has a good psychological effect on the mind of the repairer or serviceman.

DETAILED DESCRIPTION

Figure 1:
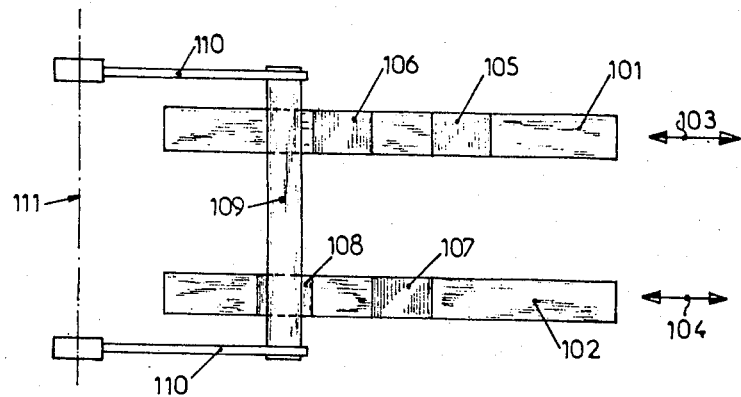
FIG. 1 is a plan view illustrating the principle of the method according to a first possible embodiment of the present invention, as regards a system with one bar and two gear selector rods.
Figure 2:
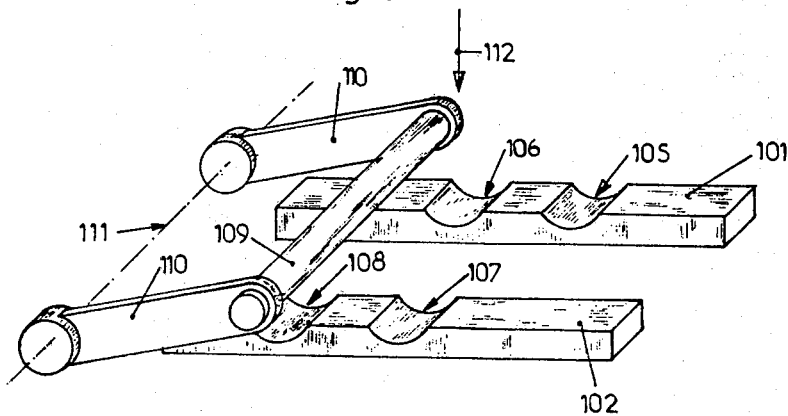
FIG. 2 is a side perspective view of the embodiment depicted in FIG. 1.

Two selector rods 101 and 102 disposed side by side are shown in FIGS. 1 and 2. Each rod can slide in the directions indicated by the arrows 103 and 104. The rod 101 carries in a known way a gear fork (not shown), while the rod 102 carries another gear fork (not shown).

The back of the rod 101 is provided with two notches 105 and 106, and the back of the rod 102 includes likewise two notches 107 and 108.

The rods 101 and 102 are disposed in parallel relationship to each other. A transverse bar 109 is disposed so as to bear on said two selector rods 101 and 102. The bar 109 is carried by two arms 110 pivotally mounted on a fixed transverse axis 111.

Elastic return means (springs or the like) apply or urge the bar 109 onto the backs of the rods 101 and 102, as shown by the arrow 112 (FIG. 2).

The operation is as follows:

If two notches such as 106 and 108 become aligned, the bar 109 falls into said notches and occupies a lowermost position.

If, on the contrary, owing to the selector rods 101 and 102 sliding, two notches do not happen to be aligned below the bar 109, the latter does not fall down, but remains in its uppermost position.

In the case shown in FIGS. 1 and 2, for instance, only one notch, viz., 108, lies under the bar 109, and the latter remains thus in its uppermost position by lying on the back of the rod 101.

The bar 109 is connected through its arms 110 to a binary detector which emits, for instance, a "0" bit if the bar 109 is in its lowermost position,
a "1" bit if said bar 109 is in its uppermost position.

Figure 3:
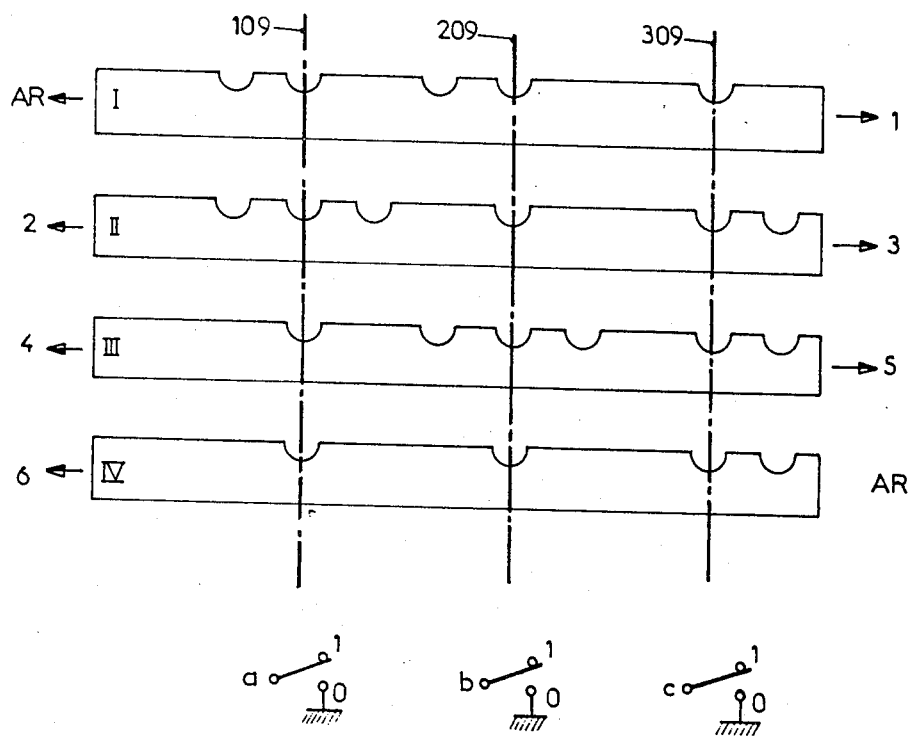
FIG. 3 is an exploded schematic view illustrating the arrangement of the notches on the backs of four selector rods of a six speed gear box, and indicating the two possible positions for each micro-switch associated with each transverse bar according to a second possible embodiment of the present invention.

FIG. 3 shows how to use the above system by mounting three transverse bars 109, 209 and 309 on the backs of four selector rods I, II, III and IV of a gear box having six forward gears 1, 2, 3, 4, 5 and 6, and one reverse gear AR.

The transverse bar 109 is connected to a binary detector $a$; the transverse bar 209 is connected to a binary detector $b$; and the transverse bar 309 is connected to a binary detector $c$. Said detectors $a$, $b$ and $c$ may, for example, be electric switches having two positions "0" and "1".

The case illustrated in FIG. 3 corresponds to the general neutral position of the gear box: the three transverse bars 109, 209 and 309 are in their lowermost positions after falling into the aligned notches of the rods I, II, III and IV.

On the other hand, for other positions of the sliding selector rods, three bit coded numbers are obtained by the binary detectors, which numbers correspond to the following standard:

| GEAR RATIOS | BARS | | |
|---|---|---|---|
| | bit 109 | bit 209 | bit 309 |
| Neutral | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| AR | 1 | 1 | 1 |

It will be seen that this allows detecting the state of the gear box by using only three detectors $a$, $b$, and $c$.

Figure 4:
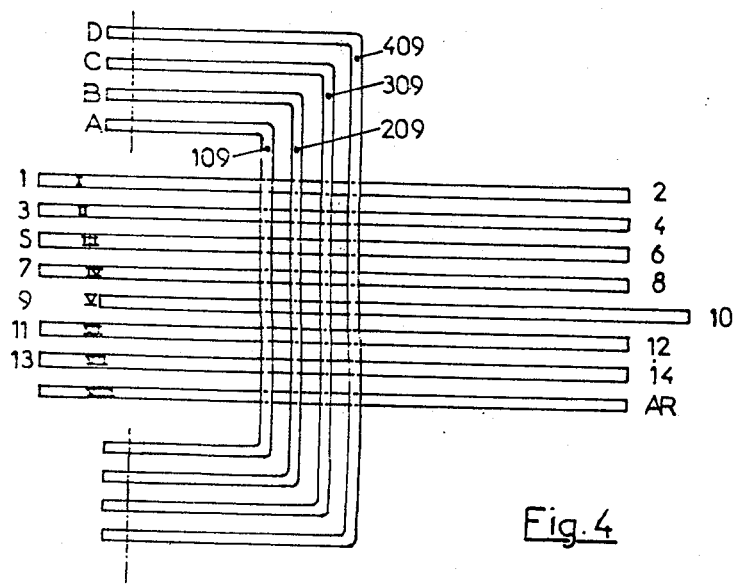
FIG. 4 shows the disposition of the four bars provided for the eight selector rods of a gear box with fifteen forward gears according to yet a third possible embodiment of the present invention.

FIG. 4 shows the disposition of four transverse bars 109, 209, 309 and 409 on eight selector rods I, II, III, IV, V, VI, VII and VIII of a gear box having fourteen forward gears, a reverse gear, and a neutral position.

In a general way, it will be seen that the method according to the invention allows equipping a gear box, while using a much smaller number of binary detectors or switches than in the conventional systems with limit switches.

By way of example, the following table illustrates a comparison for gear boxes with 5, 6, 8 or 14 gear ratios in forward motion:

| Number of forward gears | Number of possible states of the gear box | Conventional system | | Coded solution according to the invention | |
|---|---|---|---|---|---|
| | | Number of limit switches | Number of electric wires | Number of contacts | Number of wires |
| 3 | 7 | 9 | 10 | 3 | 4 |
| 6 | 8 | 11 | 12 | 3 | 4 |
| 8 | 10 | 14 | 15 | 4 | 5 |
| 14 | 16 | 21 | 22 | 4 | 5 |

I claim:

1. A method for detecting the state of a gear box, comprising the steps of:
   controlling the various gear ratios of said gear box by means of movable members;
   generating binary bits in response to the relative positions of said movable members, all of said binary bits together constituting a coded element;
   detecting said coded element with reference to a binary standard; and
   detecting the state of said gear box by determining the instantaneous position of said movable members by such detection of said coded element with reference to said binary standard.

2. A method according to claim 1, wherein:
   the various forward, reverse and neutral gear ratios are controlled by movable members such as sliding rods; and a binary logical counting code is used for detecting at every moment the position of the whole of said movable members, so that each of the possible states of the gear box is characterized by an element of a binary coding standard, all the elements of which have the same number of bits.

3. A method according to claim 1, characterized in that each bit is defined by a detector which analyzes the whole of said sliding rods of said gear box.

4. A method according to claim 3, characterized in that each detector is constituted by an electric two-position micro-switch which is capable of taking up either an open position or a closed position to emit "0" and "1" bits.

5. A method according to claim 2, characterized by using no more than three bits for a gear box having six forward gears.

6. A method according to claim 2, characterized by using no more than four bits for a gear box having fourteen forward gears.

7. A system for performing a method for detecting the state of a gear box including the steps of controlling the various gear ratios of said gear box by means of movable members, generating binary bits in response to the relative positions of said movable members, all of said binary bits together constituting a coded element, detecting said coded element with reference to a binary standard, and detecting the state of said gear box by determining the instantaneous position of said movable members by such detection of said coded element with reference to said binary standard, said system comprising, in combination:

first means for controlling the various gear ratios of said gear box;

second means for generating said binary bits in response to the relative positions of said first means, all of said binary bits together constituting said coded element;

third means for detecting said coded element with reference to said binary standard; and fourth means for detecting the state of said gear box by determining the instantaneous position of said movable means by such detection of said coded element with reference to said binary standard.

8. A detection device for carrying into effect a method for detecting the state of a gear box including the steps of controlling the various gear ratios of said gear box by means of movable members, generating binary bits in response to the relative positions of said movable members, all of said binary bits together constituting a coded element, detecting said coded element with reference to a binary standard, and detecting the state of said gear box by determining the instantaneous position of said movable members by such detection of said coded element with reference to said binary standard, and wherein the various forward, reverse and neutral gear ratios are controlled by movable members such as sliding rods, and a binary logical counting code is used for detecting at every moment the position of the whole of said movable members so that each of the possible states of the gear box is characterized by an element of a binary coding standard, all the elements of which have the same number of bits, said detection device including detectors mounted on the casing of said gear box, the number of said detectors being equal to that of said movable members such as sliding rods, while ach of said detectors supplies at every moment a "0" bit or a "1" bit, all of said bits together forming a coded element the reading of which is then made with reference to a binary standard.

9. A detection device according to claim 8, characterized in that said coding standard is constituted by:

notches provided at calculated locations on the backs of the movable members which control the gear box;

movable transverse bears, every one of which bears elastically on the backs of all the sliding rods to which it is perpendicularly oriented so that, when every rod presents a notch opposite a bar, the latter falls into said aligned notches;

binary micro-switches fitted each to one of said transverse bars, each micro-switch omitting for instance a "0" bit if the bar to which it is associated has fallen into aligned notches, and a "1" bit if at least one rod has prevented said bar from falling.

10. A detection device according to claim 8, characterized in that the whole of the detectors are carried by the removable casing of said gear box, which allows, merely by exchanging the casings, to equip an existing gear box of a known type with said detection device by providing notches on the backs of the sliding gear selector rods of said existing gear box.

* * * * *